United States Patent
Nagata et al.

(10) Patent No.: US 7,210,630 B2
(45) Date of Patent: May 1, 2007

(54) IMAGE SCANNING APPARATUS AND A HYBRID PROCESSING APPARATUS INCORPORATING THE IMAGE SCANNING APPARATUS

(75) Inventors: Norio Nagata, Matsumoto (JP); Hideki Furihata, Okaya (JP)

(73) Assignee: Seiko Epson Corporation (JP)

( * ) Notice: Subject to any disclaimer, the term of this patent is extended or adjusted under 35 U.S.C. 154(b) by 294 days.

(21) Appl. No.: 10/984,915

(22) Filed: Nov. 9, 2004

(65) Prior Publication Data

US 2005/0127182 A1    Jun. 16, 2005

(30) Foreign Application Priority Data

Nov. 10, 2003    (JP)    ............... 2003-379899

(51) Int. Cl.
*G06K 7/10*    (2006.01)
(52) U.S. Cl. ............... 235/454; 235/379; 235/380
(58) Field of Classification Search ............... 235/454, 235/379, 380, 449
See application file for complete search history.

(56) References Cited

U.S. PATENT DOCUMENTS

| | | | |
|---|---|---|---|
| 5,438,186 A | * 8/1995 | Nair et al. ............... | 235/449 |
| 6,257,783 B1 | 7/2001 | Hanaoka et al. | |
| 6,290,129 B2 | * 9/2001 | Momose ............... | 235/449 |
| 6,504,623 B1 | * 1/2003 | Ito ............... | 358/1.18 |
| 6,651,885 B1 | * 11/2003 | Arias ............... | 235/381 |

FOREIGN PATENT DOCUMENTS

JP    2000-344428    * 12/2000

* cited by examiner

*Primary Examiner*—Steven S. Paik
(74) *Attorney, Agent, or Firm*—Anderson Kill & Olick, PC

(57) ABSTRACT

An image scanning apparatus for scanning a plurality of mediums of different thicknesses with each medium scanned by pressing the medium to the scanning surface of an image scanning sensor with appropriate force using a first pressure mechanism comprising first rollers for pressing the medium to the scanning surface, a coil spring for urging the first rollers toward the scanning surface when the media thickness is less than a specified thickness, and a first tension spring for urging the first rollers to the scanning surface when the media thickness exceeds the specified thickness and a second pressure mechanism comprising second rollers for pressing the medium to the scanning surface, and a second tension spring for urging the second rollers to the scanning surface wherein the force imposed upon the scanning surface by the coil spring is substantially equal to the force imposed by the second tension spring.

13 Claims, 10 Drawing Sheets

IMAGE SCANNING APPARATUS AND A HYBRID PROCESSING APPARATUS INCORPORATING THE IMAGE SCANNING APPARATUS

BACKGROUND OF THE INVENTION

1. Field of Technology

The present invention relates to an image scanning apparatus for scanning and imaging both thin media such as checks and slips and thick media such as cards, and to a hybrid processing apparatus incorporating this image scanning apparatus.

2. Description of Related Art

Payment systems using checks are widely used throughout Europe and North America. This payment system enables businesses and consumers to use checks to make payments and financial transfers of many kinds. When a check is used, it is ultimately presented to the bank on which the check was drawn to either deposit or withdraw funds.

Bank tellers at each bank branch typically process many checks in a short time. The bank teller also typically confirms check validity, the check date, and the signature before completing the deposit or withdrawal. The teller also prints an endorsement on the back, and issues a transaction receipt as required. The teller may also require a driver license or other photo ID to check the identity of the person presenting the check (the check user), and in some situations may make a photocopy of the license or photo ID using a copying machine. A copy of the check is also captured and stored using a check scanner.

To process checks more efficiently by electromagnetically reading and processing information from each check, compact check processing terminals that can be installed at each teller window have been developed so that each teller can process checks more quickly with dependable accuracy.

These check processing terminals have a magnetic ink character reading (MICR) head, scanner head, and print head disposed along the check transportation path. When a check is received from a customer, the teller passes the check through the check processing terminal. The check processing terminal can thus read the magnetic ink characters printed on the check using the MICR head, capture an image of the check using the scanner head, and print an endorsement on the back of the check using the print head. See, for example, Japanese Unexamined Patent Appl. Pub. 2000-344428.

In Japanese patent application 2003-066747 (U.S. patent application Ser. No. 10/759,868), a hybrid processing apparatus is disclosed that can image a check and a card such as a driver license. The check transportation path and the card transportation path in this hybrid processing apparatus share part of the same media transportation path. A contact image sensor (CIS) scanner is disposed to this common portion of the transportation path so that a single scanner can be used to scan and image different types of media, that is, both checks and cards.

A CIS scanner requires pressing the scanned medium with appropriate pressure against the sensor surface (document glass) of the CIS scanner. Cards such as driver licenses and photo ID cards, and slips such as checks, are typically significantly different in thickness. As a result, if the force used to press the scanned medium to the document glass (such as the force of a pressure spring) is adjusted for use with checks, the pressure means will be too weak to press a card against the document glass, and reliably pressing such cards to the sensor surface may not be possible. This is particularly a problem when the card is warped because the card cannot be pressed sufficiently to the sensor surface, the card is therefore not held at the focal point of the scanner, and the scanned image will be out of focus and difficult to read.

On the other hand, if the force of this pressure means is adjusted for thick media such as cards, too much pressure will be applied when scanning checks and other slips. The check may therefore be wrinkled, or a paper feed error (jam) may occur.

SUMMARY OF THE INVENTION

The present invention is an image scanning apparatus that can press media of different thickness, such as both checks and cards, to the surface of an image scanning sensor with appropriate force, and a hybrid processing apparatus incorporating said image scanning apparatus.

The image scanning apparatus according to the present invention comprises a first transportation path for transporting a first medium (such as a card); a second transportation path for transporting a second medium (such as a check); with each transportation path having a common section defining a common transportation path lying contiguous to at least a portion of the first transportation path and the second transportation path respectively; an image sensor disposed along the common transportation path relative to both the first transportation path and the second transportation path; a first pressure mechanism for pressing the first medium and second medium to the image sensor; and a second pressure mechanism for pressing the second medium to the image sensor. The first pressure mechanism comprises a first pressure member for pressing the first medium and second medium to the scanning surface of the image sensor; a first elastic member for urging the first pressure member to the scanning surface when the a medium thickness is less than or equal to a specified value; and a second elastic member for urging the first pressure member to the scanning surface when the a medium thickness exceeds the specified value. The second pressure mechanism comprises a second pressure member for pressing the second medium to the scanning surface of the image sensor; and a third elastic member for urging the second pressure member to the scanning surface. The force of the first pressure member generated by the first elastic member against the scanning surface, and the force of the second pressure member generated by the third elastic member against the scanning surface, are substantially equal; and the first medium thickness being greater than the thickness of the second medium.

When the second medium is tall in the direction perpendicular to the transportation direction so that both the second pressure mechanism and the first pressure mechanism hold the second medium pressed to the scanning surface, transportation errors such as jamming and biased feeding do not occur because the first and second pressure mechanisms apply substantially equal pressure. The second medium can therefore be scanned (imaged) normally.

Preferably, the first pressure member includes at least first and second pressure rollers supported rotationally with a specific gap therebetween on a common first rotary shaft; the first pressure mechanism comprises a first support member for movably supporting the first rotary shaft in a direction substantially perpendicular to the scanning surface; and the first elastic member urges the first rotary shaft between the rollers.

Further preferably, the first and second pressure rollers are disposed with substantially the axial center of the first rotary shaft therebetween, and the first elastic member applies force at the center in the axial direction of the first rotary shaft.

Yet further preferably, the first pressure mechanism comprises a first guide shaft rotatably supporting the first support member in a direction perpendicular to the scanning surface, and the second elastic member applies force to the first support member to press the first pressure member to the scanning surface.

Yet further preferably, the first support member comprises a contact portion urged by the second elastic member to contact the scanning surface, and supports the first rotary shaft movably in the direction away from the scanning surface when the contact portion touches the scanning surface.

By constructing the first pressure mechanism as described above, the pressure applied to the first medium changes greatly according to the thickness of the medium. The first medium can therefore be pressed to the scanning surface with appropriate pressure, and a sharper, accurate image of the first medium can therefore be captured.

Yet further preferably, the second pressure member includes at least third and fourth pressure rollers rotationally supported with a specific gap therebetween on a common second rotary shaft; the second pressure mechanism comprises a second support member for supporting the second rotary shaft movably in a direction substantially perpendicular to the scanning surface; and the third elastic member applies force to the second rotary shaft between the rollers.

Further preferably, the third and fourth pressure rollers are disposed with substantially the center in the axial direction of the second rotary shaft therebetween, and the third elastic member applies force at substantially the center in the axial direction of the second rotary shaft.

Alternatively, the second pressure mechanism comprises a second guide shaft rotatably supporting the second support member in a direction perpendicular to the scanning surface, and the third elastic member applies force to the second support member to press the second pressure member to the scanning surface.

BRIEF DESCRIPTION OF THE DRAWINGS

Other objects and attainments together with a fuller understanding of the invention will become apparent and appreciated by referring to the following description and claims taken in conjunction with the accompanying drawings of which:

DESCRIPTION OF THE PREFERRED EMBODIMENTS

A preferred embodiment of an image scanning apparatus according to the present invention is described in detail as part of a hybrid processing apparatus incorporating the image scanning function.

Figure 1:
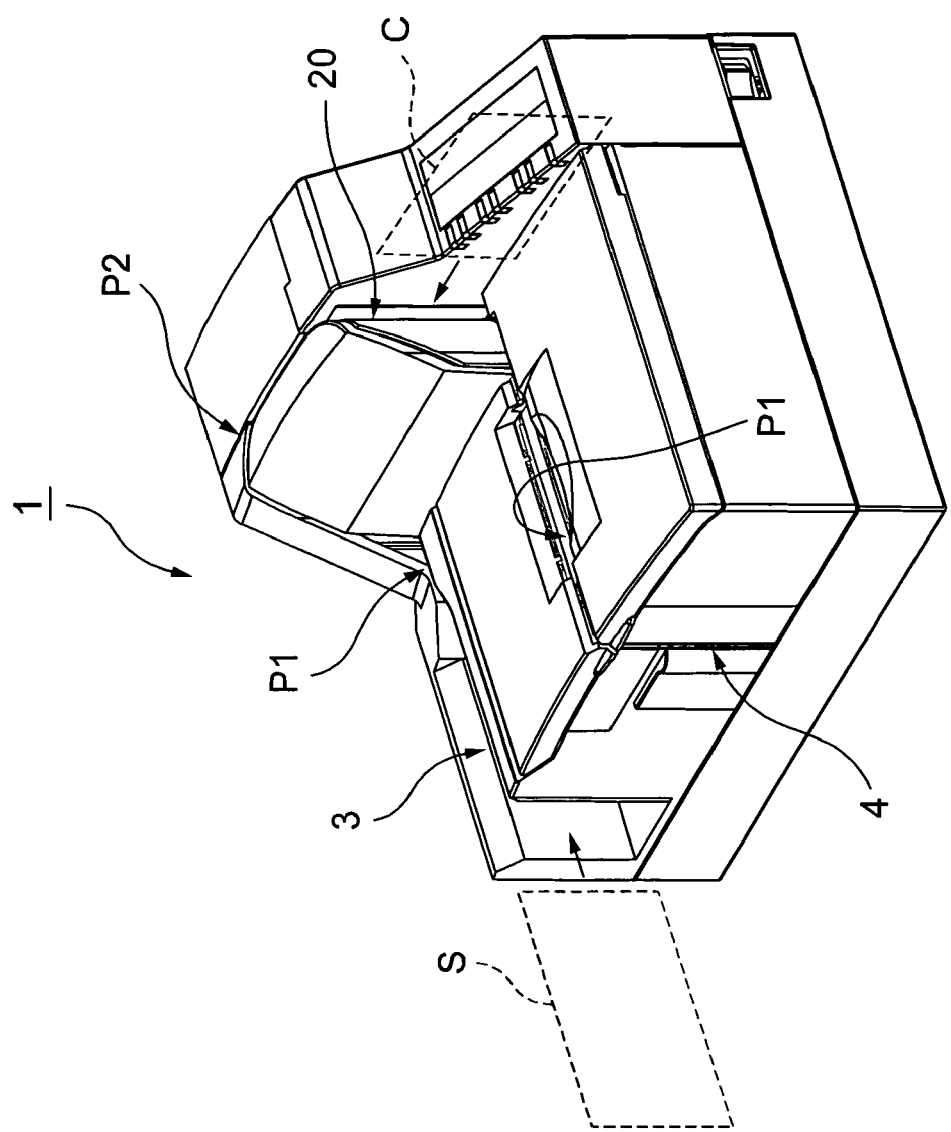
FIG. 1 is an oblique view of a hybrid processing apparatus according to this embodiment of the invention.

As shown in FIG. 1, a hybrid processing apparatus 1 according to this embodiment of the invention can scan an image of the check S, read magnetic ink characters printed on the check S, and can print to the check S, while transporting the check S (second scanning medium) loaded from a paper supply section 3 through a check transportation path P1 (second transportation path). This hybrid processing apparatus 1 can also scan a card C while conveying the card C (first scanning medium) through a card transportation path P2 (first transportation path).

Figure 2:
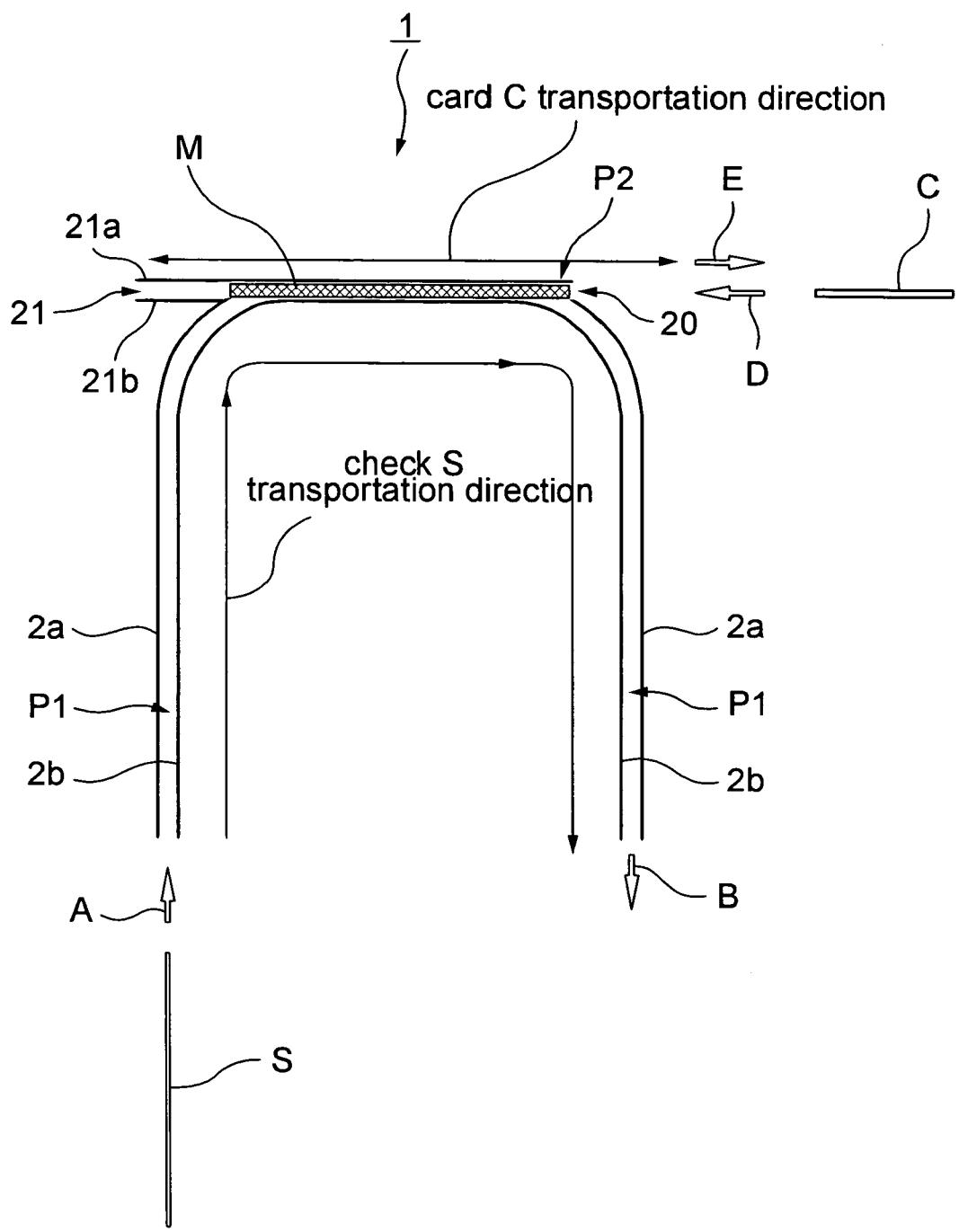
FIG. 2 is a schematic diagram showing the transportation path in this hybrid processing apparatus.

As shown in FIG. 2, the check transportation path P1 is basically U-shaped while the card transportation path P2 is straight. The check transportation path P1 and card transportation path P2 overlap to define a common path of transportation, specifically, the portion at the middle of the U-shaped path (shaded in FIG. 2). This common portion is referred to below as the middle transportation path M (common transportation path).

The check transportation path P1 is formed by an outside guide 2*a* and an inside guide 2*b* so that a check S is conveyed through space between the outside guide 2*a* and inside guide 2*b*. A check S is inserted through the paper supply section 3 in the direction of arrow A in FIG. 2 to the check transportation path P1. Multiple checks S can be stocked in the paper supply section 3, which has an automatic sheet feeder (not shown) for supplying the checks individually into the check transportation path P1.

Figure 3:
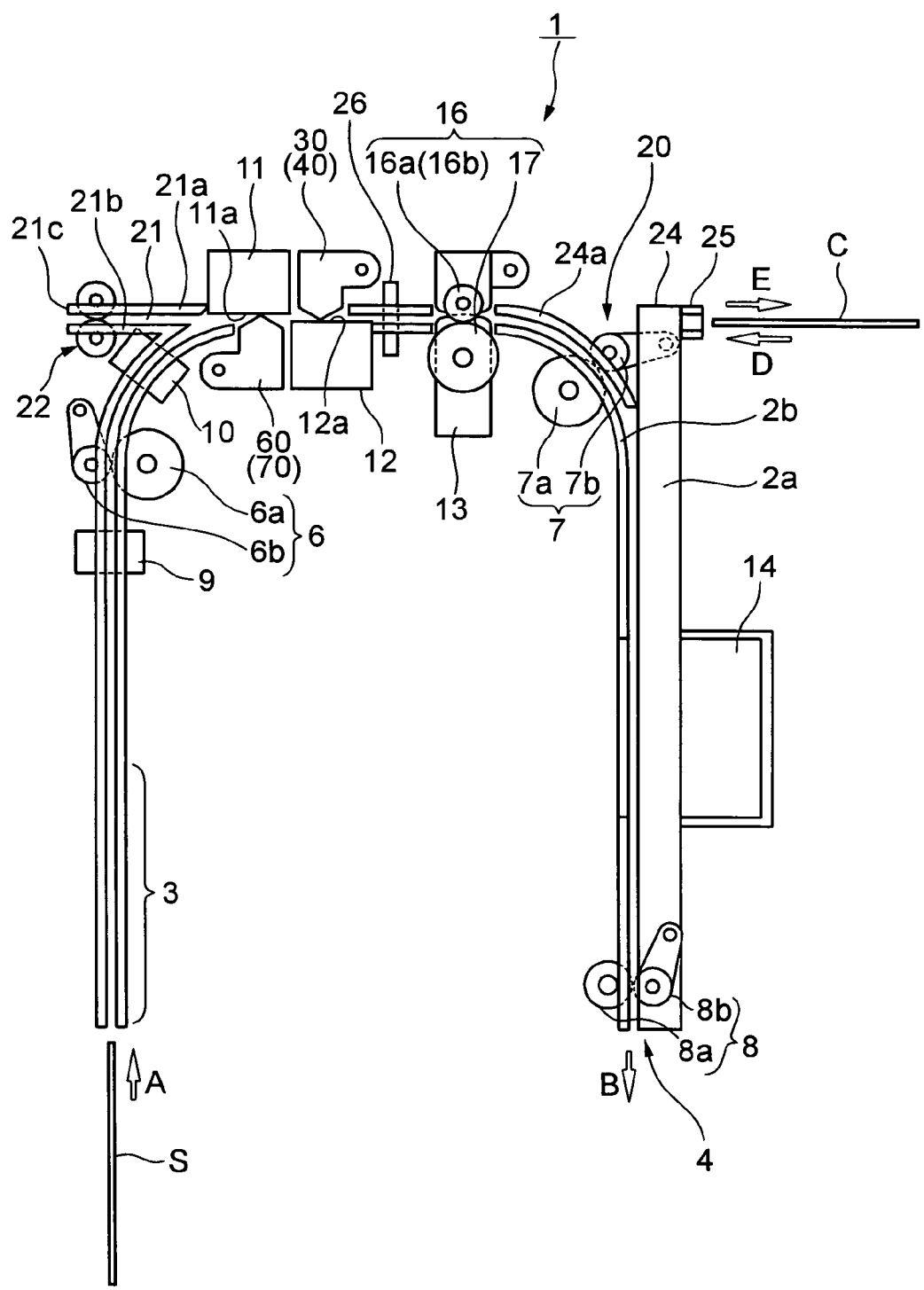
FIG. 3 is a schematic top view of the internal arrangement of the hybrid processing apparatus.

As shown in FIG. 3, a first transportation roller pair 6 is disposed on the upstream side of the middle transportation path M, a middle transportation roller set 16 is disposed to the middle transportation path M, a second transportation roller pair 7 is disposed downstream of the middle transportation path M, and a discharge roller pair 8 is disposed near the paper exit 4 of the check transportation path P1 as the transportation mechanism for conveying checks S through the check transportation path P1.

The first transportation roller pair 6 includes a drive roller 6*a* and a pressure roller 6*b* disposed on opposite sides of the check transportation path P1.

The second transportation roller pair 7 likewise includes a drive roller 7*a* and a pressure roller 7*b* disposed on opposite sides of the check transportation path P1.

The discharge roller pair 8 likewise includes a drive roller 8*a* and a pressure roller 8*b* disposed on opposite sides of the check transportation path P1.

Figure 5:
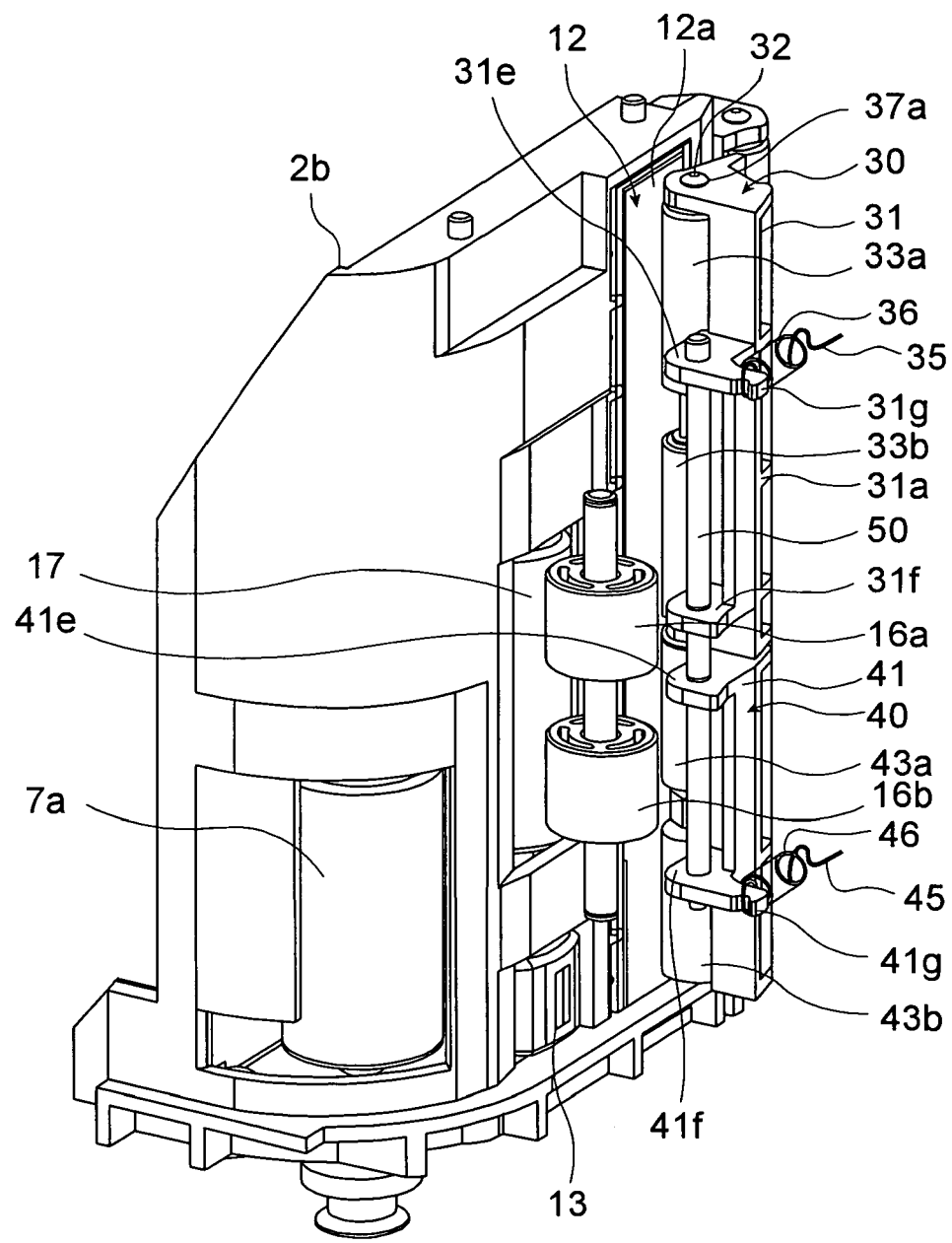
FIG. 5 is an internal oblique view showing the internal configuration near the middle transportation path of this hybrid processing apparatus.

The middle transportation roller set 16 includes a drive roller 17 and two pressure rollers 16*a*, 16*b* disposed on the opposite side of the middle transportation path M as the drive roller 17 as shown in FIG. 5.

Figure 4:
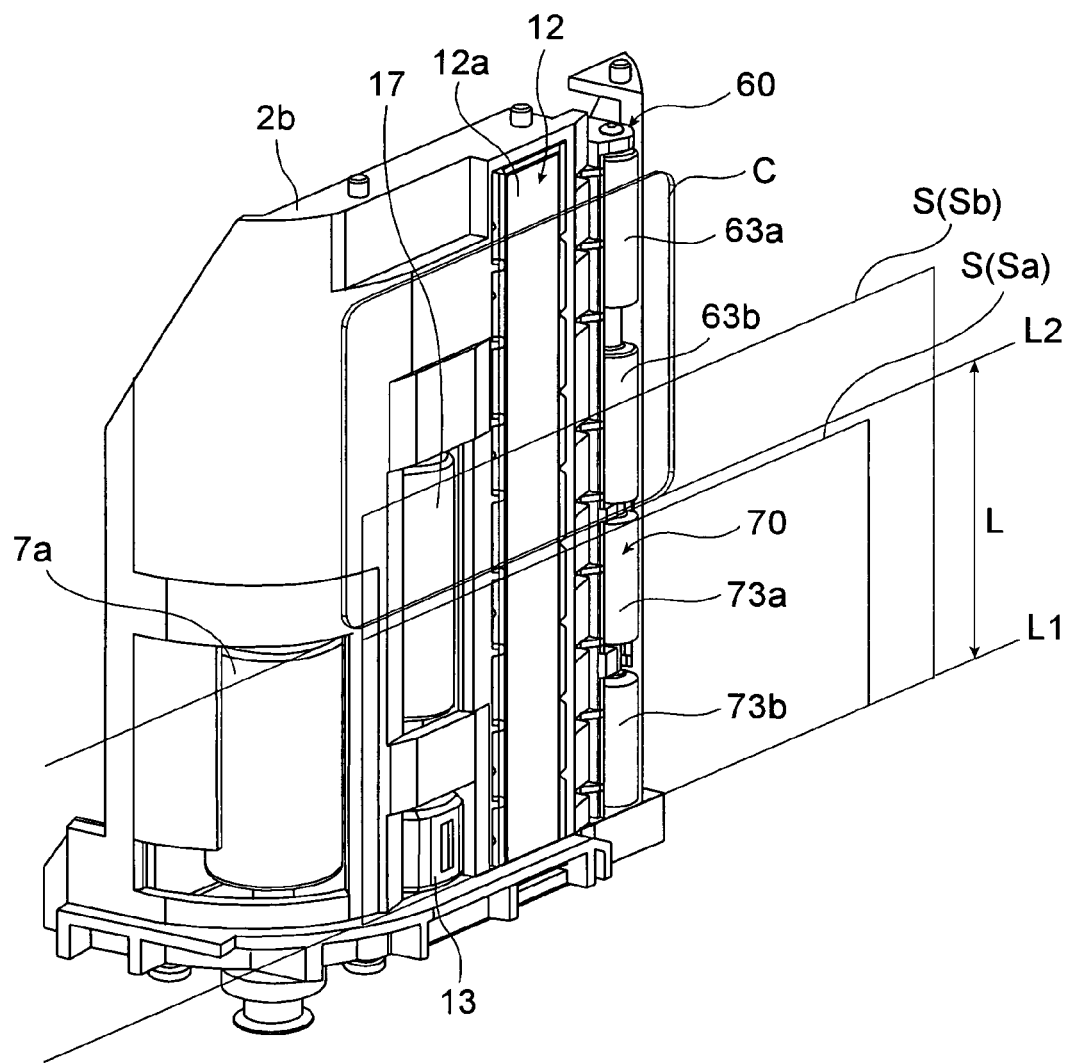
FIG. 4 is an internal oblique view showing the internal configuration near the middle transportation path of this hybrid processing apparatus.

A check S delivered into the check transportation path P1 is conveyed by the first transportation roller pair 6, middle transportation roller set 16, and second transportation roller pair 7, and is then discharged from the paper exit 4 in the direction of arrow B by the discharge rollers 8. As shown in FIG. 4, the bottom of the check transportation path P1 is held at height L1, and checks S are conveyed referenced to this height L1 along the bottom of the check transportation path P1, including through the middle transportation path M.

If the width (height) of the check S is less than a predefined height, the check S is conveyed by the lower pressure roller 16b and drive roller 17 of the middle transportation roller set 16. If the check S width is equal to or greater than this predefined height, the check S is conveyed by the drive roller 17 and both upper pressure roller 16a and lower pressure roller 16b.

As shown in FIG. 2 and FIG. 3, the card transportation path P2 includes the middle transportation path M and the card insertion slot 20 and card reversing path 21 that are contiguous to opposite ends of the middle transportation path M.

The card insertion slot 20 is an opening for inserting a card C to the middle transportation path M. As shown in FIG. 4, bottom guides 24 and 24a are disposed below the card insertion slot 20. The sides of the bottom guides 24 and 24a are part of the outside guide 2a, and the tops of the bottom guides 24 and 24a hold the bottom of the card transportation path P2 at height L2. A card C inserted through the card insertion slot 20 into the card transportation path P2 from the direction of arrow D is conveyed at this height L2 along the bottom guides 24 and 24a.

The check transportation path P1 and card transportation path P2 are thus formed at different heights separated vertically by distance L (L=L2−L1).

When a check S conveyed along the check transportation path P1 contacts the side of the bottom guide 24a, the bottom guide 24a bends the direction of travel so that the check S is conveyed toward the paper exit 4.

The upper pressure roller 16a is disposed at a height above height L2 of the card transportation path P2, and cards C are thus conveyed by the upper pressure roller 16a and drive roller 17 through the middle transportation path M (card transportation path P2).

The card reversing path 21 is formed by straight guides 21a, 21b rendered as straight extensions of the middle transportation path M in the direction leading away from the card insertion slot 20 (to the left side as seen in FIG. 2). Third transportation roller pair 22 is disposed near the end portion 21c of this card reversing path 21.

When a card C inserted from the card insertion slot 20 to the middle transportation path M is transported by the upper pressure roller 16a and drive roller 17 to the card reversing path 21, the card C is then conveyed by the third transportation roller pair 22 so that the card C overhangs a specific length from the end portion 21c of the card reversing path 21. The third transportation roller pair 22 then reverses, conveying the card C back into the middle transportation path M. The card C is then transported by the upper pressure roller 16a and drive roller 17 back through the middle transportation path M and discharged in the direction of arrow E from the card insertion slot 20.

First and second image scanning sensors 11 and 12 (CIS scanners) are disposed to the middle transportation path M. The first and second image scanning sensors 11 and 12 illuminate the surface of a check S or card C travelling along the middle transportation path M and detect the light reflected back from the check S or card C to image the check S or card C one line at a time, eventually acquiring a two-dimensional image.

First and second pressure mechanisms 30, 40 are disposed at different vertical positions heightwise to the hybrid processing apparatus 1 opposite the scanning surface 12a of the second image scanning sensor 12, and third and fourth pressure mechanisms 60, 70 are disposed at different vertical positions heightwise to the hybrid processing apparatus 1 opposite the scanning surface 11a of the first image scanning sensor 11.

As shown in FIG. 3, a BOF (bottom of form) detector 9 is disposed to the first transportation path P1 between the paper supply section 3 and first transportation roller pair 6, and a TOF (top of form) detector 10 is disposed between the first transportation roller pair 6 and first image scanning sensor 11. These detectors 9, 10 are reflection or transmission type photosensors, and detect whether a check S is present at the respective detection position.

Based on the output from these detectors 9, 10, the hybrid processing apparatus 1 can determine when a check S has been inserted from the paper supply section 3, and can detect the leading edge and trailing edge of the check S. The hybrid processing apparatus 1 can also accurately calculate the length of the check S in the transportation direction based on the output of these detectors 9, 10 and the distance the check S is transported by the first transportation roller pair 6.

The hybrid processing apparatus 1 is also designed to operate according to detection of a check S by the BOF detector 9 and TOF detector 10. More specifically, starting and stopping check imaging by the image scanning sensors 11, 12 is controlled based on output from these detectors 9, 10.

It should be noted that either one of the image scanning sensors 11, 12 could be used to detect the leading edge of the check S, in which case the TOF detector 10 is unnecessary and can be omitted.

A print head 14 is also disposed to a straight portion of the check transportation path P1 between the second transportation roller pair 7 and the discharge roller pair 8. This print head 14 can be used for printing an endorsement on the check S.

A BOC (bottom of card) detector 25 is disposed to the second transportation path P2 near the card insertion slot 20, and a TOC (top of card) detector 26 is disposed between the middle transportation roller set 16 and second image scanning sensor 12. These detectors 25, 26 are reflection or transmission type photosensors, and detect whether a card C is present at the respective detection position.

Based on the output from these detectors 25, 26, the hybrid processing apparatus 1 can determine when a card C is inserted from the card insertion slot 20, and can detect the leading edge and trailing edge of the card C. The hybrid processing apparatus 1 can also accurately calculate the length of the card C in the transportation direction based on the output of these detectors 25, 26 and the distance the card C is transported by the middle transportation roller set 16.

The hybrid processing apparatus can also operate according to card C detection by the BOC detector 25 and TOC detector 26. More specifically, starting and stopping scanning a card C by means of image scanning sensor 11 or 12 is controlled based on output from the BOC detector 25 and TOC detector 26.

It should be noted that either one of the image scanning sensors 11, 12 could be used to detect the leading edge of the card C, in which case the TOC detector 26 is unnecessary and can be omitted.

An MICR (magnetic ink character reader) 13 is disposed below the drive roller 17. This MICR 13 is a magnetic head for reading information written in magnetic ink on a check S. The MICR 13 reads information printed in magnetic ink from a check S while the check S is pressed to the surface (gap-forming surface) of the MICR 13 by a pressure lever (not shown) disposed opposite the MICR 13 with the middle transportation path M therebetween.

The pressure mechanisms (30, 40, 60, 70) are described next. The operation of and relationship between the first and second pressure mechanisms 30, 40 and the second image scanning sensor 12, and the operation of and relationship between the third and fourth pressure mechanisms 60, 70 and the first image scanning sensor 11, are the same. The following description therefore refers to the first and second pressure mechanisms 30, 40 and second image scanning sensor 12 by way of example, and further description of the third and fourth pressure mechanisms 60, 70 and first image scanning sensor 11 is omitted below except to note that third rollers 63a and 63b of the third pressure mechanism 60 correspond to the first rollers 33a, 33b of the first pressure mechanism 30, and fourth rollers 73a and 73b of the fourth pressure mechanism 70 correspond to the second rollers 43a, 43b of the second pressure mechanism 40 (see FIG. 4 and FIG. 5).

As shown in FIG. 5, the first pressure mechanism 30 and second pressure mechanism 40 are aligned parallel to the pixel array of the second image scanning sensor 12, that is, heightwise to the hybrid processing apparatus 1. The first pressure mechanism 30 presses a card C or check S to the scanning surface 12a of the second image scanning sensor 12, and the second pressure mechanism 40 presses checks S to the scanning surface 12a of the second image scanning sensor 12.

Figure 6:
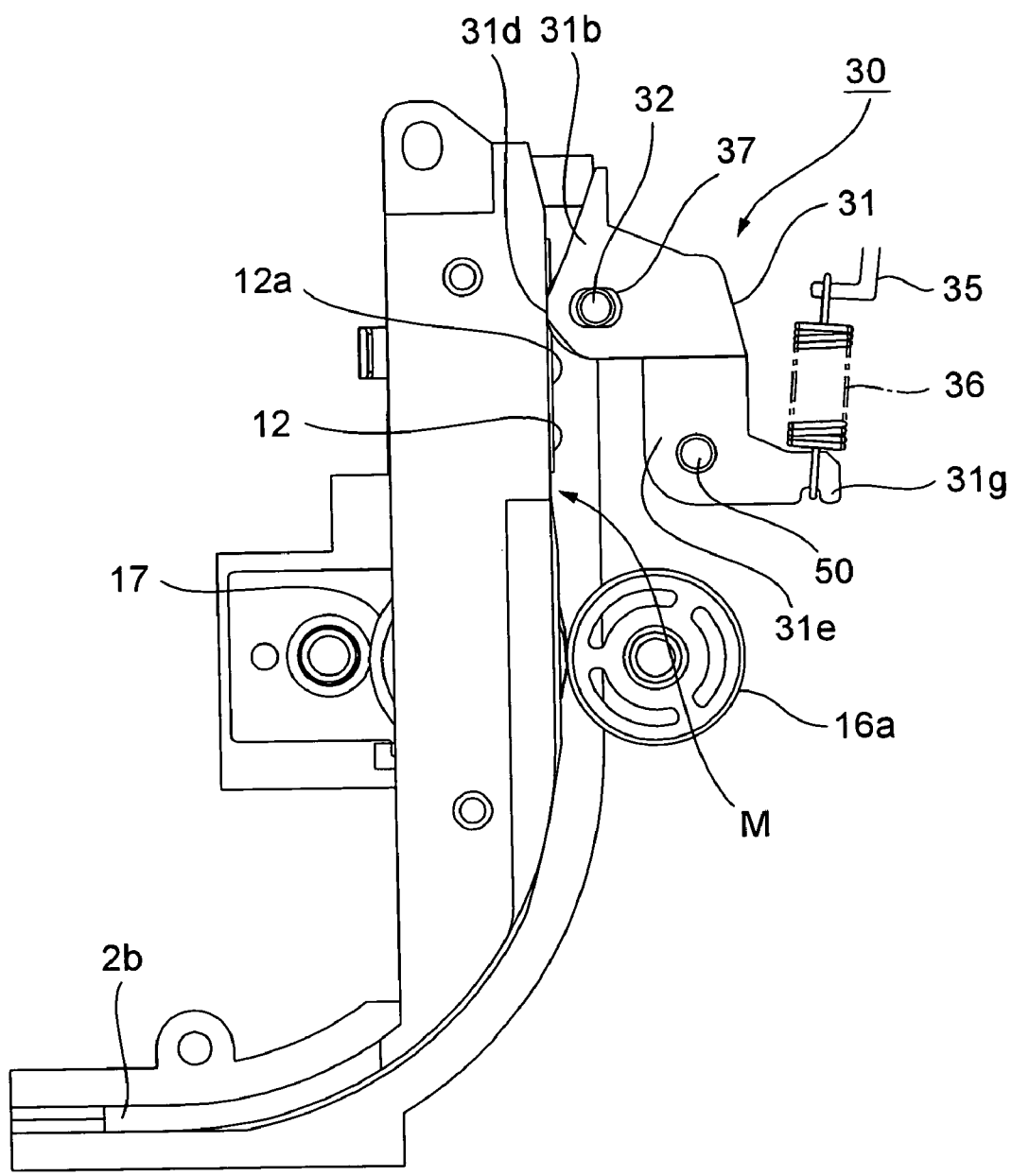
FIG. 6 is a top view of the first pressure mechanism.
Figure 7:
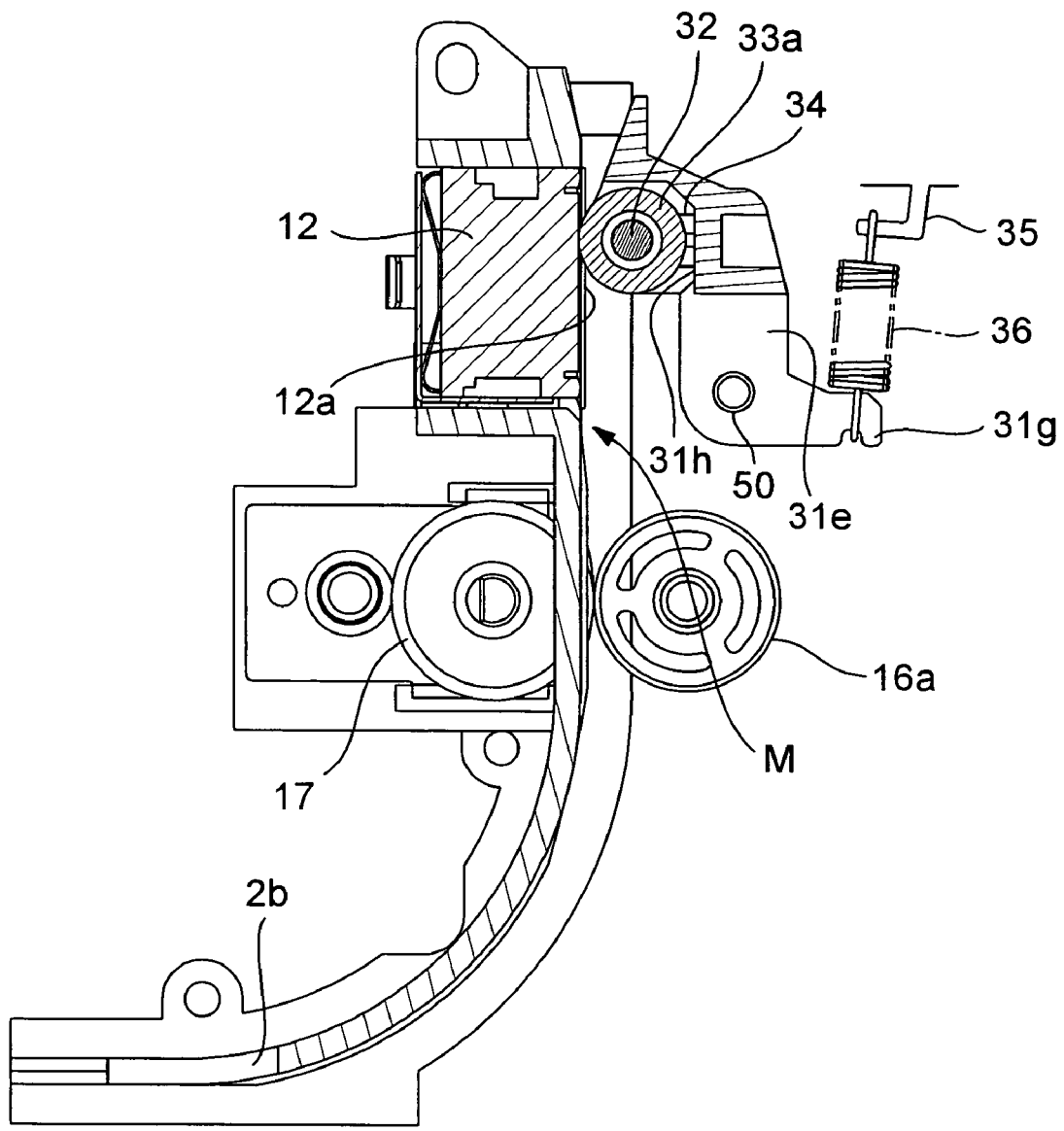
FIG. 7 is a side section view of the first pressure mechanism.

The first pressure mechanism 30 is disposed to the card transportation path P2. As shown in FIG. 5 to FIG. 7, the first pressure mechanism 30 includes a first movable guide 31, a first rotary shaft 32, first rollers 33a, 33b, a compression coil spring 34, and a first tension spring 36.

Figure 8:
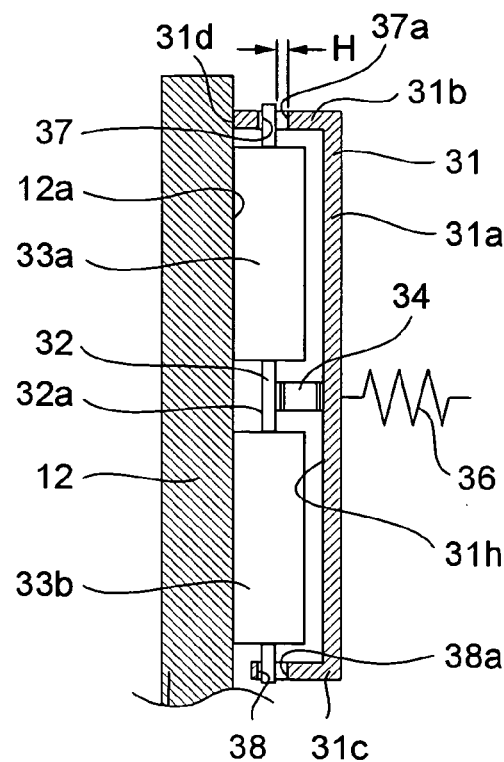
FIG. 8 is a schematic section view of the first pressure mechanism.

As shown in FIG. 8, the first movable guide 31 when seen in a side section view is basically C-shaped having an upper shaft support portion 31b and a lower shaft support portion 31c bent perpendicularly to the scanning surface 12a side of the second image scanning sensor 12 at opposite ends of a guide base 31a, which is a lengthwise member disposed parallel to the height of the hybrid processing apparatus 1. The upper shaft support portion 31b projects farther to the scanning surface 12a side of the second image scanning sensor 12 than the lower shaft support portion 31c, and the distal end 31d of the upper shaft support portion 31b functions as a stop contacting the scanning surface 12a.

Oblong (Elongated) holes 37, 38 are formed at corresponding positions vertically through the upper shaft support portion 31b and lower shaft support portion 31c, respectively, with the long axis of the holes perpendicular to the card transportation direction (i.e., perpendicular to the scanning surface 12a). The first rollers 33a, 33b are mounted on the first rotary shaft 32 with a specific gap between the rollers, and the first rotary shaft 32 is inserted to these oblong holes 37, 38. The first rotary shaft 32 is thus rendered parallel to the scanning surface 12a of the second image scanning sensor 12. The first rotary shaft 32 is the axis of rotation for the first rollers 33a, 33b, which are thus disposed with the first movable guide 31 covering a portion of the top and bottom ends of the rollers and a portion of the sides of the rollers. The first rotary shaft 32 can slide along the long axis of the oblong holes 37, 38, that is, perpendicularly to the scanning surface 12a of the second image scanning sensor 12.

The coil spring 34 is disposed between the middle portion 32a of the first rotary shaft 32 between the first rollers 33a, 33b, and the inside surface 31h of the guide base 31a. This coil spring 34 urges the first rotary shaft 32 toward the second image scanning sensor 12, thus pressing the first rollers 33a, 33b to the scanning surface 12a of the image scanning sensor 12.

The first rollers 33a, 33b are preferably disposed symmetrically to the center in the axial direction of the first rotary shaft 32, and the coil spring 34 is preferably disposed to urge this center position perpendicularly to the second image scanning sensor 12.

As also shown in FIG. 5, two guide mounting portions 31e, 31f are disposed in unison to the side surface of the guide base 31a projecting to the card insertion slot 20 side substantially parallel to the card transportation direction with a specific vertical gap between the guide mounting portions 31e, 31f. The first movable guide 31 is assembled to rotate freely on a guide shaft 50 on intervening guide mounting portions 31e, 31f. The guide shaft 50 is disposed parallel to the vertical direction, that is, parallel to the scanning surface 12a.

A hook 31g projecting away from the card transportation path P2 is formed integrally to the upper guide mounting portion 31e. One end of the first tension spring 36 engages this hook 31g. The other end of the first tension spring 36 is caught on a stationary portion 35 disposed at the back side of the first image scanning sensor 11, for example, thereby urging the hook 31g in the direction substantially parallel to the card transportation direction. The first movable guide 31 thus rotates on the guide shaft 50 with the distal end 31d of the upper shaft support portion 31b positioned touching the scanning surface 12a of the second image scanning sensor 12. See FIG. 6, for example.

When no check S or card C is present over the scanning surface 12a of the second image scanning sensor 12, and the distal end 31d of the upper shaft support portion 31b is positioned in contact with the scanning surface 12a of the second image scanning sensor 12, the first rotary shaft 32 is separated a specified distance H from the ends 37a, 38a on the long axis of the oblong holes 37, 38 that are farthest from the second image scanning sensor 12.

The force of the first tension spring 36 applying pressure to the scanning surface 12a of the second image scanning sensor 12 by way of distal end 31d of the upper shaft support portion 31b is greater than the force of the coil spring 34 pressing on the scanning surface 12a of the second image scanning sensor 12 by way of first rotary shaft 32 and first rollers 33a, 33b.

When the distal end 31d of the upper shaft support portion 31b contacts the scanning surface 12a, the urging force of the first tension spring 36 is balanced with the sum of the resistance (repulsion force) of the scanning surface 12a and the urging force of the coil spring 34. The force of the coil spring 34 pressing on the scanning surface 12a by way of the first rotary shaft 32 and first rollers 33a, 33b at this time is not affected by the urging force of the first tension spring 36, and is determined only by the spring constant and compression of the coil spring 34.

The structure of the second pressure mechanism 40 is described next referring to FIG. 5 and FIG. 9. The second pressure mechanism 40 is disposed to the check transportation path P1. This second pressure mechanism 40 includes a second movable guide 41, second rotary shaft 42, second rollers 43a, 43b, and second tension spring 46.

Figure 9:
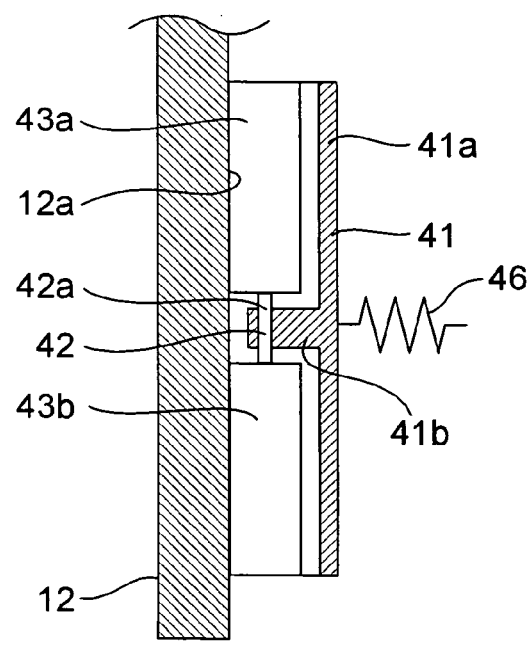
FIG. 9 is a schematic section view of the second pressure mechanism.

As shown in FIG. 9, the second movable guide 41 has a long guide base 41a disposed parallel to the height of the hybrid processing apparatus 1, and a shaft support portion 41b formed integrally to the lengthwise middle portion of the guide base 41a. The second rollers 43a, 43b are assembled on the second rotary shaft 42, and the middle portion 42a of the second rotary shaft 42 is assembled freely rotatably to the shaft support portion 41b. The second rotary shaft 42 is the axis of rotation for the second rollers 43a, 43b, which are fit to the shaft above and below the middle portion 42a of the second rotary shaft 42 with a specific gap therebetween.

As shown in FIG. 5, two guide mounting portions 41e, 41f are disposed in unison to the side surface of the guide base 41a projecting to the card insertion slot 20 side substantially parallel to the card transportation direction with a specific vertical gap between the guide mounting portions 41e, 41f. The second movable guide 41 is assembled to rotate freely on the guide shaft 50 on intervening guide mounting portions 41e, 41f. The guide shaft 50 is disposed parallel to the vertical direction, that is, parallel to the scanning surface 12a, as noted above.

A hook 41g projecting away from the check transportation path P1 is formed integrally to the lower guide mounting portion 41f. One end of the second tension spring 46 engages this hook 41g. The other end of the second tension spring 46 is caught on a stationary portion 45 disposed at the back side of the first image scanning sensor 11, for example, thereby urging the hook 41g in the direction substantially parallel to the check transportation direction. The second movable guide 41 thus rotates on the guide shaft 50 with the second rollers 43a, 43b positioned touching the scanning surface 12a of the second image scanning sensor 12.

The pressure applied by the second tension spring 46 on the scanning surface 12a of the second image scanning sensor 12 by way of intervening second rollers 43a, 43b is substantially equal to the pressure applied by the coil spring 34 on the scanning surface 12a of the second image scanning sensor 12 by way of intervening first rollers 33a, 33b.

The coil spring 34 of the first pressure mechanism 30 and the second tension spring 46 of the second pressure mechanism 40 are (weak) springs for pressing a check S or a thin card C to the scanning surface 12a, and the first tension spring 36 of the first pressure mechanism 30 is a (strong) spring for pressing thick cards C to the scanning surface 12a.

Referring next to FIGS. 10A, 10B and FIGS. 11A, 11B, the operation of the first pressure mechanism 30 and second pressure mechanism 40 is described next.

Scanning a check Sa that is narrower (shorter) than the specified length (height) L is described first.

Figure 10A:
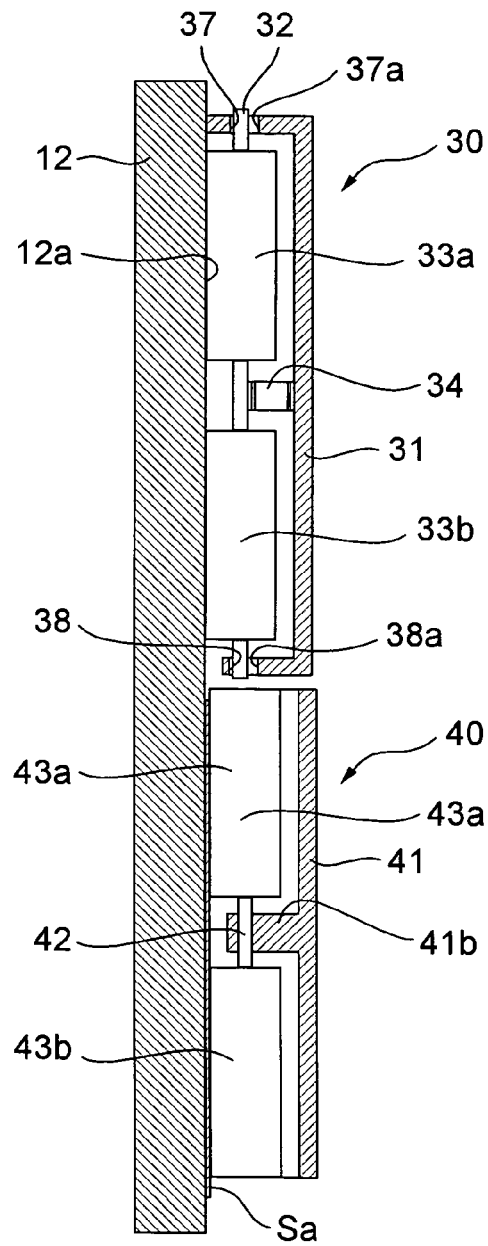
FIG. 10A and FIG. 10B describe the operation of the first pressure mechanism and second pressure mechanism.

When the check Sa is conveyed to the second image scanning sensor 12 along the check transportation path P1 at height L1, the check Sa is fed between the second rollers 43a, 43b and the scanning surface 12a as shown in FIG. 10A. The thickness of the check Sa causes the second movable guide 41 to turn while the check Sa is pressed to the scanning surface 12a by the urging force of the second tension spring 46 applied to the check Sa by the intervening second rollers 43a, 43b. The check Sa is thus pressed to the scanning surface 12a by the weak force of the second tension spring 46. The second image scanning sensor 12 images the check Sa as the check is thus conveyed through the check transportation path P1.

Scanning a different check Sb that is equal to or wider (taller) than the specified length (height) L is described next.

Figure 10B:
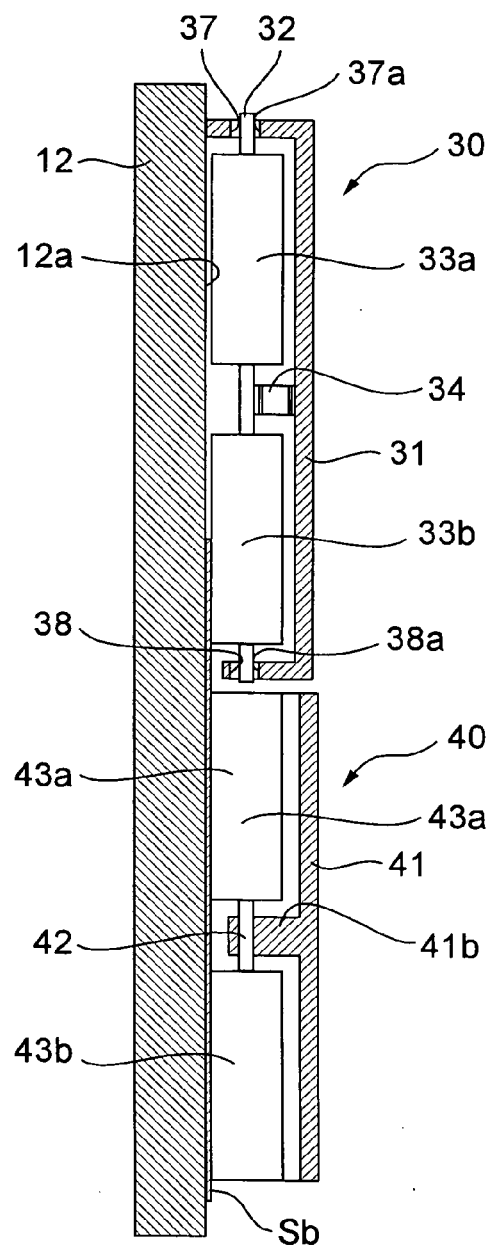

This check Sb is conveyed through the check transportation path P1 at height L1 in the same way as the narrower check Sa described above to the second image scanning sensor 12, and is thus fed as shown in FIG. 10B with the bottom portion of the check Sb held between the second rollers 43a, 43b and the scanning surface 12a, and the top portion of the check Sb held between the first rollers 33a, 33b (or the first roller 33b) and the scanning surface 12a.

The thickness of the check Sb displaces the first rotary shaft 32 at the top portion of the check Sb away from the scanning surface 12a in the oblong holes 37, 38 while the thickness of the bottom portion of the check Sb causes the second movable guide 41 to turn. As a result, the top portion of the check Sb is pressed to the scanning surface 12a by the force of the coil spring 34 by way of intervening first rollers 33a, 33b (or the first roller 33b), and the bottom portion is pressed to the scanning surface 12a by the force of the second tension spring 46 by intervening second rollers 43a, 43b. A wide check Sb is thus pressed to the scanning surface 12a by the weak force of coil spring 34 and second tension spring 46. The second image scanning sensor 12 images the check Sb as the check Sb is thus conveyed through the check transportation path P1.

When processing a check Sb being equal to or wider than the specified width L, the second rollers 43a, 43b of the second pressure mechanism 40 apply pressure to the bottom portion of the check Sb while the first roller 33b (or the first rollers 33b and 33a) of the first pressure mechanism 30 applies pressure to the top portion of the check S. The force of the coil spring 34 on the top part of the check Sb is substantially equal to the force of the second tension spring 46 on the bottom part of the check Sb. Equal pressure is thus applied to the bottom and top portions of the check Sb, and transportation problems resulting from applying uneven force through the thickness of the check are prevented.

Figure 11A:
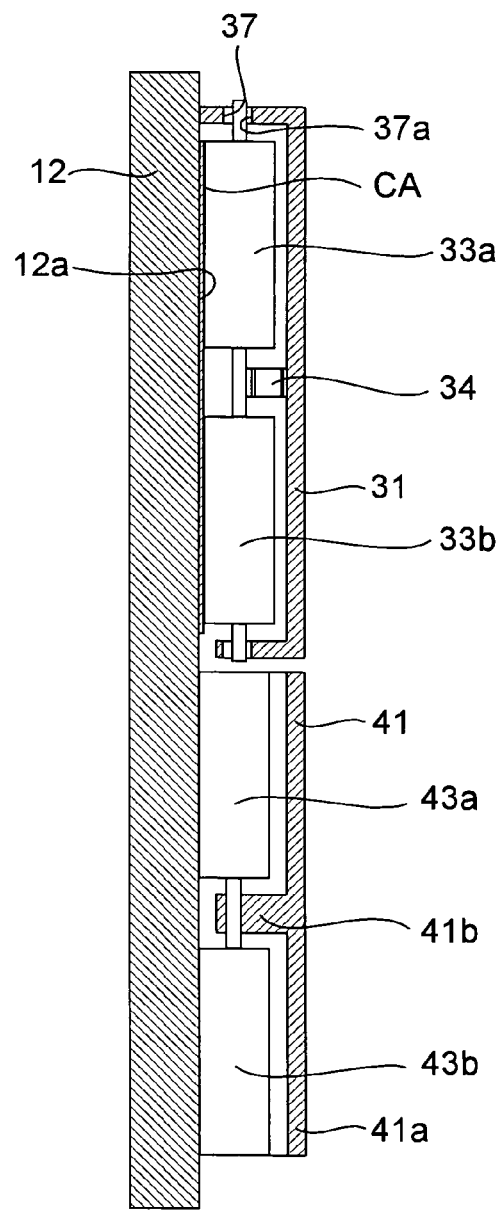
FIG. 11A and FIG. 11B describe the operation of the first pressure mechanism and second pressure mechanism.

Scanning a thin card Ca of thickness ha (ha<=specified distance H) is described next. A thin card Ca inserted from the card insertion slot 20 is carried through the card transportation path P2 at height L2 passed the second image scanning sensor 12 and into the card reversing path 21. The card Ca is then reversed in the card reversing path 21 and transported back to the second image scanning sensor 12. As shown in FIG. 11A, the card Ca is fed between the first rollers 33a, 33b and the scanning surface 12a when the card Ca reaches the second image scanning sensor 12. The thickness of the card C pushes out on the first rollers 33a, 33b, displacing the first rotary shaft 32 along the oblong holes 37, 38 in the direction away from the scanning surface 12a.

Because the thickness ha of this thin card Ca is not sufficient for the first rotary shaft 32 to push against the ends 37a, 38a of the oblong holes 37, 38 (ha<=H), the distal end 31d of the upper shaft support portion 31b remains touching the scanning surface 12a. As a result, the first rollers 33a, 33b are urged only by the coil spring 34, and are not affected by the urging force of the first tension spring 36. The thin card Ca is thus pressed to the scanning surface 12a by the force of the coil spring 34 by way of intervening first rollers 33a, 33b. That is, the card Ca is pressed by the weak force of the coil spring 34. The second image scanning sensor 12 then images the card Ca as the card Ca is transported through the card transportation path P2.

Figure 11B:
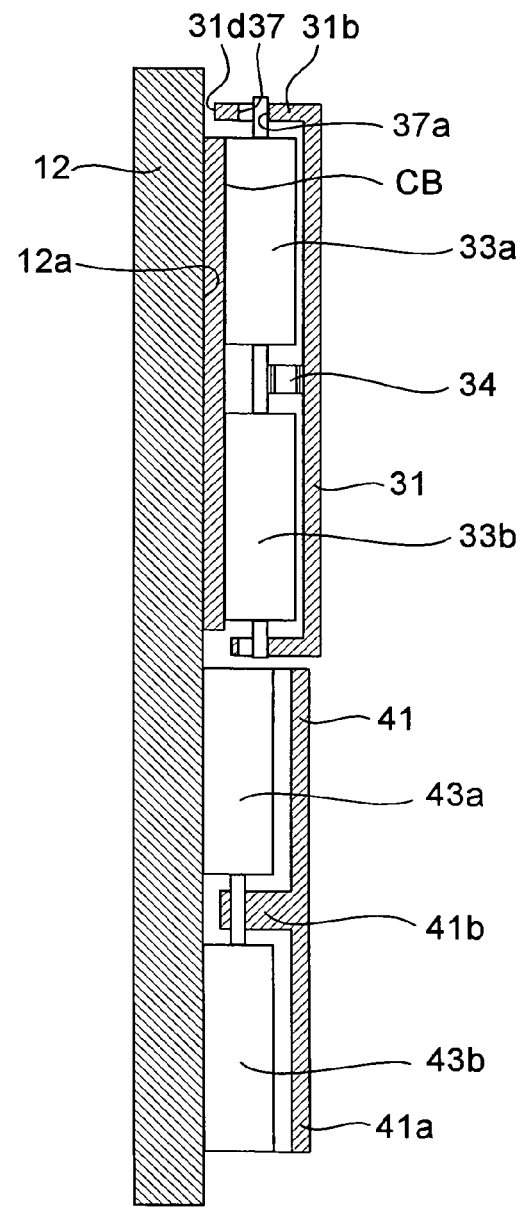

Scanning a thick card Cb of thickness hb (hb>specified distance H) is described next. As is a thin card Ca, a thick card Cb inserted from the card insertion slot 20 is carried through the card transportation path P2 at height L2 passed the second image scanning sensor 12 and into the card reversing path 21. The card Cb is then reversed in the card reversing path 21 and transported back to the second image scanning sensor 12. As shown in FIG. 11B, the card Cb is fed between the first rollers 33a, 33b and the scanning surface 12a when the card Ca reaches the second image scanning sensor 12.

The thickness of the card Cb pushes out on the first rollers 33a, 33b, displacing the first rotary shaft 32 along the oblong holes 37, 38 in the direction away from the scanning surface 12a. Because the thickness hb of this card Cb is greater than the specified distance H, the first rotary shaft 32 pushes against the ends 37a, 38a of the oblong holes 37, 38, causing the first movable guide 31 to turn, and separating the distal end 31d of the upper shaft support portion 31b from the scanning surface 12a. As a result, the card Cb is pressed to the scanning surface 12a by the force of the first tension spring 36 through intervening first rollers 33a, 33b. The card Cb is thus pressed to the scanning surface 12a by the strong force of the first tension spring 36. The second image scanning sensor 12 then images the card Cb as it is thus conveyed through the card transportation path P2.

When the thickness of the media exceeds a specified distance (thickness) H, the first rollers 33a, 33b thus suddenly and nonlinearly change the pressure applied to the card. More specifically, the first pressure mechanism 30 changes the pressure acting on the medium (such as card C or check S) according to the thickness of the medium by means of coil spring 34 and first tension spring 36. When movement of the first rotary shaft 32 supporting the first rollers 33a, 33b relative to the first movable guide 31 is within a predefined distance, the coil spring 34 applies pressure to the medium. However, when the movement of the first rotary shaft 32 relative to the first movable guide 31 exceeds this predefined distance, the first tension spring 36 works to press the medium to the scanning surface 12a.

As described above, a hybrid processing apparatus 1 according to the present invention comprises a check transportation path P1 and a card transportation path P2 rendered at different elevations, and two pressure mechanisms 30, 40 for applying pressure appropriate to the type (such as thickness and material) of the medium conveyed in each transportation path. As a result, jamming due to excessive pressure being applied, and scanning errors due to loss of focus due to insufficient pressure being applied, are avoided.

Furthermore, the pressure applied when a thin card Ca is transported and the pressure applied when a thick card Cb is transported does not change linearly using a single spring, but changes nonlinearly as a result of using two springs. Therefore, when scanning two types of cards (media) of different thickness, the pressure applied by the first rollers 33a, 33b changes greatly, and cards C can be conveyed with pressure applied appropriately according to the card thickness.

More specifically, feed jams, soiling, and damage resulting from applying excessive pressure to a thin card Ca are prevented. In addition, thick cards Cb do not slip due to insufficient pressure, and thick cards Cb can be conveyed reliably. Furthermore, when the edge of a thick card Cb is nipped or released by the first rollers 33a, 33b, a weak repulsion force acts on the card Cb rather than a strong force. Compared with a mechanism using only one spring, the change in the transportation load when the edge of the card is nipped or released is reduced, and variation in the feed pitch and scanning can be prevented.

Anticipating that both sides of the card C would be scanned, both the first pressure mechanism 30 and third pressure mechanism 60 vary the asserted pressure nonlinearly by way of coil spring (34) and first tension spring (36). However, if only one side of the card C is scanned, the other pressure mechanism (third pressure mechanism 60, for example) can be configured identically to the second pressure mechanism 40.

The distal end 31d of the upper shaft support portion 31b of the first movable guide 31 contacts the scanning surface 12a in the foregoing embodiment, but could contact the inside guide 2b instead.

The second pressure mechanism 40 (fourth pressure mechanism 70) has a second movable guide 41 rotationally supported on a guide shaft 50, and a second tension spring 46 for urging the second movable guide 41. A compression coil spring could, however, be used instead to urge the second rotary shaft 42 to the scanning surface 12a similarly to the coil spring 34 in the first pressure mechanism 30.

Furthermore, the check transportation path P1 and card transportation path P2 are disposed vertically to each other in the middle transportation path M of the foregoing embodiment, but the transportation paths could be arranged horizontally to each other.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An image scanning apparatus for scanning and imaging at least a first and second medium of different thicknesses comprising:
   a first transportation path for transporting the first medium;
   a second transportation path for transporting the second medium;
   with each transportation path having a common section defining a common transportation path lying contiguous to at least a portion of the first transportation path and the second transportation path;
   an image sensor disposed along the common transportation path relative to both the first transportation path and the second transportation path;
   a first pressure mechanism for pressing the first medium and second medium to the image sensor; and
   a second pressure mechanism for pressing the second medium to the image sensor;
   wherein the first pressure mechanism comprises
      a first pressure member for pressing the first medium and second medium to the scanning surface of the image sensor;
      a first elastic member for urging the first pressure member to the scanning surface when a medium thickness is less than or equal to a specified value; and
      a second elastic member for urging the first pressure member to the scanning surface when a medium thickness exceeds the specified value;
   wherein the second pressure mechanism comprises
      a second pressure member for pressing the second medium to the scanning surface of the image sensor; and
      a third elastic member for urging the second pressure member to the scanning surface;
   wherein the first pressure member imposes a force upon the scanning surface due to the first elastic member which is substantially equal to the force imposed on the scanning surface by the second pressure member due to the third elastic member and
   wherein the first medium has a thickness greater than the thickness of the second medium.

2. The apparatus of claim 1, wherein:
the first pressure member includes at least first and second pressure rollers supported rotationally with a specific gap therebetween on a common first rotary shaft;
the first pressure mechanism comprises a first support member for movably supporting the first rotary shaft in a direction substantially perpendicular to the scanning surface; and
the first elastic member applies force to the first rotary shaft between the rollers.

3. The apparatus of claim 2, wherein:
the first and second pressure rollers are disposed with substantially the center in the axial direction of the first rotary shaft therebetween; and
the first elastic member applies force at substantially the center in the axial direction of the first rotary shaft.

4. The apparatus of claim 3, wherein:
the first pressure mechanism comprises a first guide shaft rotatably supporting the first support member in a direction perpendicular to the scanning surface; and
the second elastic member applies force to the first support member to press the first pressure member to the scanning surface.

5. The apparatus of claim 2, wherein:
the first pressure mechanism comprises a first guide shaft rotatably supporting the first support member in a direction perpendicular to the scanning surface; and
the second elastic member applies force to the first support member to press the first pressure member to the scanning surface.

6. The apparatus of claim 5, wherein:
the first support member comprises a contact portion urged by the second elastic member to contact the scanning surface, and supports the first rotary shaft movably in the direction away from the scanning surface when the contact portion touches the scanning surface.

7. The apparatus of claim 6, wherein:
the force imposed by the first pressure member upon the scanning surface due to the first elastic member is less than the force imposed by the first pressure member upon the scanning surface due to the second elastic member.

8. The apparatus of claim 1, wherein:
the second pressure member includes at least third and fourth pressure rollers having a specific gap therebetween and being supported rotationally on a common second rotary shaft;
the second pressure mechanism comprises a second support member for supporting the second rotary shaft movably in a direction substantially perpendicular to the scanning surface; and
the third elastic member applies force to the second rotary shaft between the rollers.

9. The apparatus of claim 8, wherein:
the third and fourth pressure rollers are disposed with substantially the center in the axial direction of the second rotary shaft therebetween; and
the third elastic member applies force at substantially the center in the axial direction of the second rotary shaft.

10. The apparatus of claim 1, wherein:
the second pressure mechanism comprises a second guide shaft rotatably supporting the second support member in a direction perpendicular to the scanning surface; and
wherein the third elastic member applies force to the second support member to press the second pressure member to the scanning surface.

11. The apparatus of claim 1, wherein:
the first pressure member and second pressure member are in tandem.

12. The apparatus of claim 1, wherein:
the first medium is a card, and the second medium is a check.

13. A hybrid processing apparatus comprising an image scanning apparatus for scanning and imaging at least a first and second medium with the image scanning apparatus comprising:
a first transportation path for transporting the first medium;
a second transportation path for transporting the second medium;
with each transportation path having a common section defining a common transportation path lying contiguous to at least a portion of the first transportation path and the second transportation path;
an image sensor disposed along the common transportation path relative to both the first transportation path and the second transportation path;
a first pressure mechanism for pressing the first medium and second medium to the image sensor; and
a second pressure mechanism for pressing the second medium to the image sensor;
wherein the first pressure mechanism comprises
a first pressure member for pressing the first medium and second medium to the scanning surface of the image sensor;
a first elastic member for urging the first pressure member to the scanning surface when a medium thickness is less than or equal to a specified value; and
a second elastic member for urging the first pressure member to the scanning surface when a medium thickness exceeds the specified value;
wherein the second pressure mechanism comprises
a second pressure member for pressing the second medium to the scanning surface of the image sensor; and
a third elastic member for urging the second pressure member to the scanning surface; and with the hybrid apparatus further comprising a print head for printing to at least one medium and/or a magnetic character reading (MICR) head.

* * * * *